(12) United States Patent
Macleod

(10) Patent No.: US 7,612,715 B2
(45) Date of Patent: Nov. 3, 2009

(54) DIRECTION FINDING

(75) Inventor: Malcolm Davd Macleod, Malvern (GB)

(73) Assignee: Qinetiq Limited (GB)

( * ) Notice: Subject to any disclaimer, the term of this patent is extended or adjusted under 35 U.S.C. 154(b) by 213 days.

(21) Appl. No.: 10/563,495

(22) PCT Filed: Jul. 5, 2004

(86) PCT No.: PCT/GB2004/002902

§ 371 (c)(1),
(2), (4) Date: Jan. 4, 2006

(87) PCT Pub. No.: WO2005/010550

PCT Pub. Date: Feb. 3, 2005

(65) Prior Publication Data

US 2006/0158375 A1    Jul. 20, 2006

(30) Foreign Application Priority Data

Jul. 12, 2003   (GB) ................. 0316402.7

(51) Int. Cl.
*G01S 5/04* (2006.01)
(52) U.S. Cl. ............................ 342/432
(58) Field of Classification Search ............... 342/359, 342/360, 368–465
See application file for complete search history.

(56) References Cited

U.S. PATENT DOCUMENTS

| | | | | |
|---|---|---|---|---|
| 3,534,368 A | * | 10/1970 | Perper | 342/423 |
| 3,950,753 A | * | 4/1976 | Chisholm | 342/399 |
| 4,481,519 A | * | 11/1984 | Margerum | 342/434 |
| 4,486,757 A | * | 12/1984 | Ghose et al. | 342/417 |
| 4,489,327 A | | 12/1984 | Eastwell | |
| 5,574,468 A | * | 11/1996 | Rose | 342/442 |
| 6,278,406 B1 | * | 8/2001 | Kuwahara | 342/417 |
| 6,281,840 B1 | * | 8/2001 | Miyoshi et al. | 342/374 |
| 6,950,064 B2 | * | 9/2005 | Schantz | 342/427 |
| 2002/0008656 A1 | | 1/2002 | Landt | |
| 2002/0190902 A1 | | 12/2002 | Samson et al. | |

FOREIGN PATENT DOCUMENTS

| | | |
|---|---|---|
| FR | 2717905 | 9/1995 |
| GB | 1576616 | 10/1980 |

* cited by examiner

*Primary Examiner*—Thomas H Tarcza
*Assistant Examiner*—Nga X Nguyen
(74) *Attorney, Agent, or Firm*—McDonnell Boehnen Hulbert & Berghoff LLP

(57) ABSTRACT

Direction findings by radio comprises arraigning an array of antennas, to receive signals from emitters, selecting individual antenna signals using a first multipole switch and determining, antenna signal strengths. Individual antenna signals are also selected by mutipole switch, which routes a selected signal to a third multipole switch. The third switch switches a phase shifter into and out of an antenna signal path. An adder is employed to add an antenna signal in a first signal path extending via the first multipole switch to a different antenna signal in a second signal path extending via the second and third switches. This determines combined signal strengths between pairs of antenna signals, one of which either has or has not been relatively phase shifted depending on the third switch position. Covariance matrix elements are determined from signal strengths enabling emitter bearings to be derived.

20 Claims, 3 Drawing Sheets

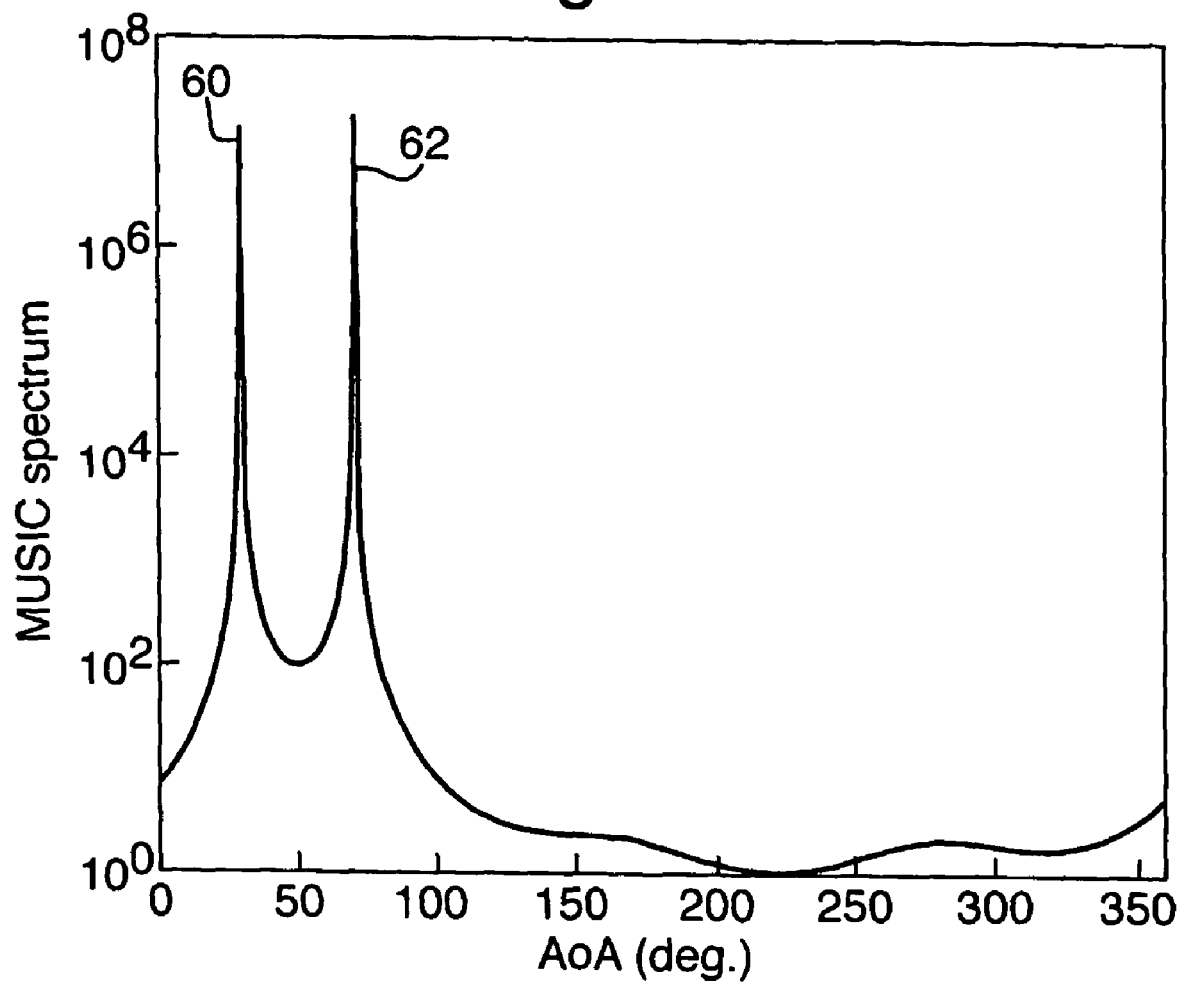

DIRECTION FINDING

BACKGROUND OF THE INVENTION (1) Field of the Invention

This invention relates to direction finding, and more particularly to direction finding using radio techniques.

(2) Description of the Art

Direction finding by radio is known. In a direction finding system having a number of separate antennas, radio wavefronts reach the antennas with different delays. Assuming the wavefronts have narrow bandwidth, these delays give rise solely to relative phase shifts. For determining the directions or bearings of M−1 radio frequency (RF) emitters (M is a positive integer), a typical direction finding system employs M antennas, a respective receiver for each antenna, and processing circuitry for each receiver. The processing circuitry implements a discrete Fourier transform to divide its respective signal into frequency bins or channels. Signals are then combined in pairs, and for each channel a respective covariance matrix is constructed from which emitter bearings are estimated. This approach suffers from the problem of requiring as many receivers as there are antennas, receivers being expensive and bulky. It is unsuitable for example for man-portable equipment or for mounting in small aircraft.

To get round the multiple receiver problem, it has been proposed to use a single port receiver, spatial spectrum estimation technology, and a weight perturbation algorithm to obtain the covariance matrix. See Zhao Yimin, "A Single Port Receiver Spatial Spectrum Estimate DF System", 0-7803-3216-4/96 IEEE 1996. This is however a relatively complex approach to the problem.

It has also been proposed to combine RF antenna signals in beamformers and use a single receiver connected to successive beamformers via a multipole switch, one pole per beamformer. See C M S See, "High Resolution DF with a Single Channel Receiver", 0-7803-7011-2/01 IEEE 2001. A single spatial covariance matrix is formed, and the bearings or directions of up to M−1 emitters can be estimated, where M is the number of antennas. This requires $M^2$ beamformers, another source of expense and bulk.

Another solution is adopted in the Rohde & Shwartz DDF 195 instrument, which combines pairs of RF antenna signals with each of four relative phase shifts inserted between them in succession by means of switches This requires only a single receiver, and uses one antenna as a reference antenna, combining its output with that of other antennas in turn with multiple switched phase shifts. However, the method is for estimating the bearing of a single emitter only. A patents search has indicated that the following patent documents EP455102, DE4014407, DE3636630, DE19529271 and DE2723746 are related to direction finding.

US patent application no. US 2002/0190902 A1 describes sampling RF signals from M antennas at a sampling rate equal to or greater than the signal bandwidth multiplied by 2M. This is followed by Fourier transformation of resulting signal samples to provide spectra. Direction finding is then based on line configuration in the spectra and associated phase and amplitude data. It employs a multiplicity of directional antennas to provide beamforming.

U.S. Pat. No. 4,486,757 to Ghose et al. discloses a direction finder having two separated antennas for reception of respective signals from a remote source, phase shifting one signal by 90 degrees relative to the other and nulling one signal using an error correction loop. The operation of the loop is monitored and used to calculate a bearing for the remote source. It does not appear to use receivers.

Direction finders of various kinds are also disclosed in U.S. Pat. No. 4,489,327 to Eastwell, British patent no. 1,576,616 and US patent application no. 2002/0008656 to Landt.

SUMMARY OF THE INVENTION

It is an object of the present invention to provide an alternative form of direction finding.

The present invention provides a direction finding system incorporating a plurality of antennas characterised in that the system also includes:

a) means for determining individual antenna signal strengths;

b) combining means for determining combined antenna signal strengths by forming combinations of first and second antenna signals derived from different antennas, wherein the second antenna signals are in two sets with signals in one set having a non-zero phase difference relative to signals the other set; and c) means for determining at least one emitter bearing from antenna signal strengths The invention provides the advantage of requiring only a single receiver when successive signal strengths are determined in successive steps, which reduces cost and bulk and still provides a viable direction finding technique.

The means for determining emitter bearing may be arranged to derive covariance matrix elements from antenna signal strengths and to determine emitter bearing therefrom. It may alternatively be arranged to derive a relationship between antenna signal strengths and emitter bearing and to determine emitter bearing therefrom.

The relative phase difference may be in the range 30 to 120 degrees, preferably substantially 90 degrees.

The combining means may be arranged to combine antenna signals with equal gain magnitude and with equal and unequal phase. It may incorporate phase shifting means switchable into and out of an antenna signal path, and an adder having two inputs both switchably connected to individual signal paths extending to respective antennas.

The means for determining individual antenna signal strengths may comprise a first multipole switch having input poles connected to receive signals from respective antennas; the combining means may incorporate a second multipole switch having input poles connected to receive signals from respective antennas and a third multipole switch for switching phase shifting means into and out of an antenna signal path extending via the second multipole switch; and the combining means may also incorporate adding means for combining signals, the adding means being arranged to add an antenna signal in a first signal path extending via the first multipole switch to another antenna signal in a second signal path extending via the second and third multipole switches.

In another aspect, the present invention provides a method of direction finding using a plurality of antennas characterised in that the method incorporates:

a) determining individual antenna signal strengths;

b) determining combined antenna signal strengths by forming combinations of first and second antenna signals derived from different antennas, wherein the second antenna signals are in two sets with signals in one set having a non-zero phase difference relative to signals the other set; and c) means for determining at least one emitter bearing from antenna signal strengths.

Emitter bearing may be determined by deriving covariance matrix elements from antenna signal strengths and determining emitter bearing therefrom. It may alternatively be determined by deriving a relationship between antenna signal strengths and emitter bearing and determining emitter bearing therefrom.

The relative phase difference may be in the range 30 to 120 degrees, preferably substantially 90 degrees, and successive signal strengths may be determined in successive steps.

The step of forming combined antenna signal strengths combines antenna signals with equal gain magnitude and with equal and unequal phase. It may include switching phase shifting means into and out of an antenna signal path, and adding signals in signal paths extending switchably to different antennas.

The step of determining individual antenna signal strengths may comprise switching signals from antennas via a first path. The step of forming combined antenna signal strengths may incorporate:
a) switching signals from antennas via a first path for combining;
b) switching signals from antennas via a switch selectable second path or a third path for combining, the third path being arranged to phase shift antenna signals therein relative to antenna signals in the second path; and
c) adding a first path antenna signal to second and third path antenna signals individually.

DESCRIPTION OF THE FIGURES

In order that the invention might be more fully understood, embodiments of the invention will now be described, by way of example only, with reference to the accompanying drawings, in which:

FIG. 4 is a graph illustrating direction finding results obtained using a multiple receiver prior art system;

DETAILED DESCRIPTION OF THE INVENTION

Figure 1:
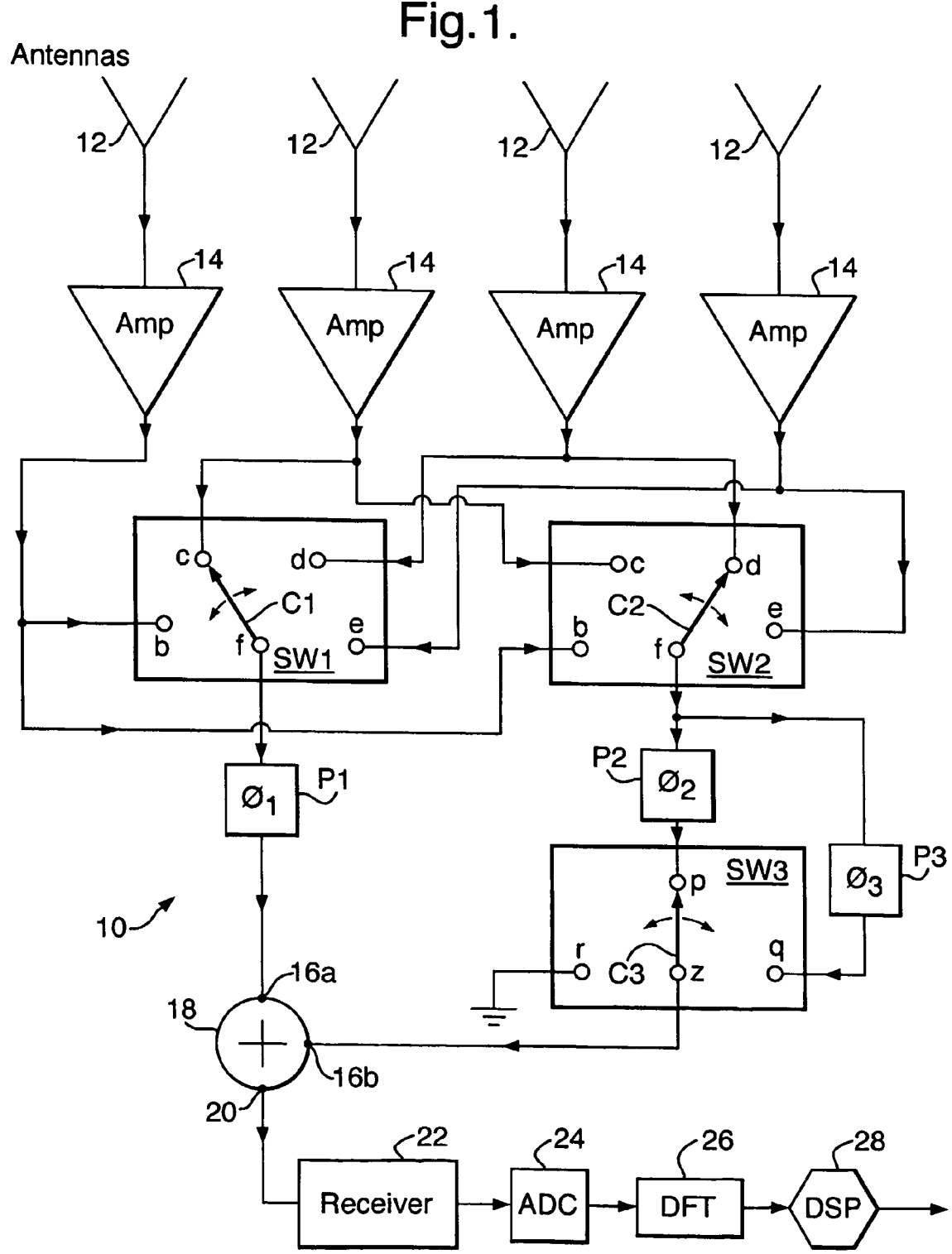
FIG. 1 is a schematic block diagram of a direction finding system of the invention.

Referring to FIG. 1, a direction finding system of the invention is indicated generally by 10. As illustrated for the purposes of this example, the system 10 incorporates four antennas 12 each of which is conventional, i.e. omnidirectional. In general, as many antennas may be used as are required to detect a desired number of emitters, i.e. M antennas for M−1 emitters. Signals pass from the antennas 12 via respective buffer amplifiers 14 to first and second multipole switches SW1 and SW2, the amplifiers 12 being connected to respective input poles b, c, d and e of both switches. The multipole switches SW1 and SW2 have respective movable contacts C1, C2 which allow any of the associated input poles b to d in each case to be connected to respective output poles f.

The output pole f of the first switch SW1 is connected to a first phase shifter P1 introducing a phase shift of $\phi_1$, and the output pole f of the second switch SW2 is connected to second and third phase shifters P2 and P3 introducing phase shifts of $\phi_2$ and $\phi_3$ respectively. In the present example, where an ideal situation is envisaged, all three phase shifters P1 to P3 have a gain of unity: the first and second phase shifts $\phi_1$ and $\phi_2$ are zero (and the associated phase shifters P1 and P2 could be removed and replaced by connections), and the third phase shift $\phi_3$ is 90 degrees. However, non-ideal gains/phases can be accommodated by calibration (as will be described later).

Satisfactory performance has been demonstrated with errors-up to plus or minus 60 degrees: in other words the phase difference 3 introduced by the third phase shifter P3 may be anything in the range ±30 to ±120 degrees, with simultaneous gain discrepancy of up to 3 dB compared to unity. Larger discrepancies result in progressive deterioration of performance. This implies the third phase shifter P3 providing for $\phi_3$ to be preferably in the range 30 to 120 degrees different to $\phi_2$ but $\phi_1$ is unrestricted. It is also acceptable for phase shift and gain to vary with frequency, provided the phase shift is reasonably close to 90 degrees and phase shifter gains are reasonably close to 1.0, and that these parameters are stable and predetermined functions of frequency.

An output signal from the first phase shifter P1 passes to a first input 16a of an adder 18. Output signals from the second and third phase shifters P2 and P3 pass to first and second input poles p and q respectively of a third multipole switch SW3, which has a third input pole r connected to ground. The third switch SW3 has a movable contact C3 which allows any of the associated input poles p, q and r to be connected to an output pole z, which in turn is connected to a second input 16b of the adder 18.

FIG. 1 is a somewhat idealised drawing in which all components are assumed to be perfect and (where appropriate) matched. In practice, in a non-ideal situation, components may need to be trimmed or impedance matched to counteract unwanted effects by inserting additional circuitry. This is well known in the art of electronics and will not be described.

The adder 18 has an output 20 connected to a series-connected chain of elements consisting of a receiver 22, an analogue to digital converter (ADC) 24, a discrete Fourier transformer 26 and a digital signal processor (DSP) 28. The digital elements 24 to 28 may be replaced by equivalent analogue processing if desired. The transformer 26 provides a discrete Fourier transform (DFT) of length N points with windowing. This is a well-known calculation and will not be described: see e.g. A V Oppenheim and R W Schafer with J. R. Buck, "Discrete Time Signal Processing", Prentice Hall, Englewood Cliffs, N.J. USA, 1999. The DFT is advantageously computed by fast Fourier transform (FFT), but this is not essential. The choice N=1 corresponds to the trivial case equivalent to no discrete Fourier transform present.

The direction finding system 10 operates as follows. By appropriate choice of the positions of the movable switch contacts C1 to C3, any antenna signal may be added to any other antenna signal, or selected alone by adding it to a zero signal at grounded input r of third switch SW3. Assuming that the three phase shifters P1 to P3 have equal gain magnitudes, antenna signals at the adder inputs 16a and 16b have a relative phase shift between them equal to $\phi_1-\phi_2$ or $\phi_1-\phi_3$ according to whether the third switch movable contact C3 is connected to its first or second input pole p or q respectively. In the ideal case, $\phi_1=\phi_2=0$ and $\phi_3=90$ degrees. In this case, the relative phase shift is 0 or 90 degrees (ignoring sign) between adder input signals according to whether the third switch movable contact C3 is connected to its first or second input pole p or q.

The receiver 22 has a front-end bandpass filter (not shown) to attenuate unwanted signals outside a frequency band in which the antenna signals appear. It processes the adder output signal and converts it to a complex output in a base band convenient for sampling and analogue to digital conversion at 24. The sampling rate of the ADC 24 must be sufficiently high to avoid aliasing, i.e. it must exceed the bandwidth of the receiver front-end bandpass filter. If, for example, the front-end bandwidth is 25 MHz, and a 512-point DFT is implemented by the transformer 26, the ADC sampling rate would be at least 27.5 MHz, and it would take approximately 20 µs to acquire 512 samples for the transformer 26. The digital signal from the ADC 24 is converted by the transformer 26 into a spectrum in terms of a set of frequencies expressed as bins or channels of finite width each with an associated magnitude. The frequency channels would be approximately 100 kHz wide for a 512 point DFT with sampling at 27.5 MHz. A DFT is implemented with windowing to reduce leakage between channels. The options for choice of window include a rectangular window equivalent to no window.

Optionally, selection of settings of movable contacts C1 to C3 may be made in such a way that not all antennas contribute. This gives faster processing, but possibly less accuracy, and it reduces the maximum number of emitters that can be detected.

As has been mentioned, the various possible settings of the switches SW1, SW2 and SW3 allow the receiver 22 to input either the signal from any individual antenna 12, or a sum of relatively phase shifted signals from any pair of antennas 12. The switches SW1 to SW3 may be operated to give a random or pseudo-random selection of antenna signals to avoid possible deleterious effects with particular signals. The output of the receiver 22 is sampled by the ADC 24 and processed by the transformer 26, which computes the N-point windowed DFT of a block of N consecutive samples from the ADC. This is a well known procedure and will not be described in detail. The output of the transformer 26 comprises N frequency domain samples, i.e. magnitudes of the contents of the N frequency bins. For the general or nth frequency bin, the frequency domain sample is denoted by $S^n$, where n is a frequency domain index in the range 0 to N−1. $S_k^n$ is defined as the discrete Fourier transformer output with frequency index n if the kth antenna is connected through the first switch SW1, the third switch SW3 is connected to 0V at r, and the gain of the entire path from the kth antenna to the receiver input is unity.

The process of direction finding consists of estimating the bearing or angle of incidence or angle of arrival of one or more signals received by the antennas 12. It is carried out for one or more frequency bins by the DSP 28, which processes frequency domain samples $S^n$.

A complex gain constant $G_{1k}$ is now defined to represent both gain and phase shift applied to a radio signal in a path through the kth antenna 12 (k=1 to M), the first switch SW1, the first phase shifter P1 and the adder 20 to the receiver 22. Similarly, complex gain constants $G_{2Ak}$ and $G_{2Bk}$ are now defined to represent both gain and phase shift applied to a radio signal in paths to the receiver 22 through the kth antenna 12 via (inter alia) the second and third phase shifters P2 and P3 respectively.

With the first switch SW1 connected to the buffer amplifier 14 of the kth antenna and the third switch SW3 connected to 0V at r, the transformer output with frequency index n is the product $G_{1k}S_k^n$. This transformer output has a mean squared value or power $P_{kk}$ associated with the kth antenna and given by:

$$P_{kk}=E\{|G_{1k}S_k^n|^2\}=|G_{1k}|^2E\{|S_k^n|^2\} \quad (1)$$

where $E\{\ldots\}$ is the mathematical expectation operator and $|\ldots|$ (as in e.g. $|S_k^n|$) represents a modulus. The DSP 28 computes a measurement (or "estimate") of $P_{kk}$ which either equals a single value of $S^n$ or equals an average or weighted average of several values of $S^n$, these values being obtained from the discrete Fourier transforms of respective blocks of data collected with switch contacts C1 to C3 set to the appropriate positions. These blocks of data may be overlapping or non-overlapping. For clarity in the following explanation, the notation $P_{kk}$ will denote the measurement of $P_{kk}$ obtained as described above.

The first switch SW1 is connected to the buffer amplifier 14 of each antenna 12 in turn, i.e. the antenna index k goes from 1 to M where M is the number of antennas, and the third switch SW3 remains connected to 0V at r. The transformer output power $P_{kk}$ is measured in each case.

The first switch SW1 is now connected to the kth antenna, the second switch SW2 is connected to the mth antenna, and the second switch signal path with gain $G_{2Am}$ is selected by connecting the third switch movable contact C3 to its first input p. The power $P_{kmA}$ associated with gain $G_{2Am}$ at the transformer output with frequency bin index n is then measured, and it is given by:

$$P_{kmA}=E\{|G_{1k}S_k^n+G_{2Am}S_m^n|^2\} \quad (2)$$

i.e. $P_{kmA}=|G_{1k}|^2E\{|S_k^n|^2\}+|G_{2Am}|^2E\{|S_m^n|^2\}+$
$$2Re\{G_{1k}G^*_{2Am}E\{S_k^n S_m^{n*}\}\} \quad (3)$$

where $Re\{\ldots\}$ represents "real part of" and the asterisk "*" a complex conjugate. $P_{kmA}$ is measured for all possible pairings of different antennas 12, of which there are $^MC_2$ pairs. The value of $P_{kmA}$ is measured by the DSP 28 in the same way as it measures $P_{kk}$, as previously described, and the same convention is adopted that the notation $P_{kmA}$ is used in what follows to refer to the measurement.

In the same way, the procedure associated with Equations (2) and (3) is now repeated, except that the second switch signal path with gain $G_{2Bm}$ is now selected by connecting the third switch movable contact C3 to its second input q to implement phase shift $\phi_3$ instead of $\phi_2$. The power $P_{kmB}$ associated with gain $G_{2Bm}$ at the transformer output with frequency index n is then measured for each antenna pairing, and following equivalents of Equations (2) and (3) may be generated by replacing index A with index B.

$$P_{kmB}=E\{|G_{1k}S_k^n+G_{2Bm}S_m^n|^2\} \quad (4)$$

i.e. $P_{kmB}=|G_{1k}|^2E\{|S_k^n|^2\}+|G_{2Bm}|^2E\{|S_m^n|^2\}+$
$$2Re\{G_{1k}G^*_{2Bm}E\{S_k^n S_m^{n*}\}\} \quad (5)$$

In order to carry out direction finding, the gains $G_{1k}$, $G_{2Am}$ and $G_{2Bm}$ must first be determined at every frequency of interest, i.e. at the centre frequencies of those frequency bins defined by the DFT operation in the transformer 26 which are associated with emitters. In one approach, this may be done by making electrical measurements of the complex gain of the individual components of the system, or of groups of components. Such a procedure is well known in the art of electronics and will not be described.

In an alternative embodiment, the determination of the gains may advantageously be carried out by a procedure as follows. A radio emitter is set up in a known location, and the direction finding system 10 is then operated to make the measurements described in Equations (1) to (5), for each combination of pairs of antennas, by setting switch contacts C1 to C3 to the appropriate positions. Using the known values of the emitter power, bearing and distance from the antennas, the quantities $E\{|S_k^n|^2\}$, $E\{|S_m^n|^2\}$, and $E\{S_k^n S_m^{n*}\}$ in Equations (1) to (5) may be calculated at each frequency of interest. The only unknown quantities in Equations (1) to (5) are then the values of the gains $G_{1k}$, $G_{2Am}$ and $G_{2Bm}$, which may therefore be determined using a procedure known as non-linear optimisation (see e.g. M S Bazaraa, H D Sherali, C M Shetty, "Nonlinear Programming—Theory and Algorithms", Wiley, New York, $2^{nd}$ Ed, 1993). This is well known in the art of scientific computing and will not be described. The accuracy of the estimates of the gains $G_{1k}$, $G_{2Am}$ and $G_{2Bm}$ will usually be improved by moving the emitter to one or more further known positions, repeating the collection of measurements described in Equations (1) to (5), and using the entire set of measurements in the non-linear optimisation procedure.

Once the gains have been determined, one procedure for carrying out direction finding is as follows. The value of $P_{kk}$ is measured for each antenna 12 in turn and the value of $E\{|S_k^n|^2\}$ is then estimated using Equation (1) and the previously determined value of $G_{1k}$ as:

$$E\{|S_k^n|^2\} = P_{kk}/|G_{1k}|^2 \tag{6}$$

Similarly the values of $P_{kmA}$ are measured for each combination of antennas 12 in turn. Using the previously determined values of $G_{1k}$, $G_{2Am}$, together with the values of $E\{|S_k^n|^2\}$ and $E\{|S_m^n|^2\}$ computed above, and Equation (3), a quantity x is now computed for each antenna pairing from:

$$x = (\tfrac{1}{2})(P_{kmA} - |G_{1k}|^2 E\{|S_k^n|^2\} - |G_{2Am}|^2 E\{|S_m^n|^2\}) \tag{7}$$

$$\text{i.e. } x = Re\{G_{1k}G^*_{2Am}E\{S_k^n S_m^{n*}\}\} \tag{8}$$

In the same way, the values of $P_{kmB}$ are measured for each pair of antennas 12 in turn. Using the previously determined values of $G_{1k}$, $G_{2Bm}$, the values of $E\{|S_k^n|^2\}$ and $E\{|S_m^n|^2\}$ computed above, and Equation (5), a quantity y is now computed for each antenna pairing from:

$$y = (\tfrac{1}{2})(P_{kmB} - |G_{1k}|^2 E\{|S_k^n|^2\} - |G_{2Bm}|^2 E\{|S_m^n|^2\}) \tag{9}$$

$$\text{i.e. } y = Re\{G_{1k}G^*_{2Bm}E\{S_k^n S_m^{n*}\}\} \tag{10}$$

The known complex value $G_{1k}G^*_{2Am}$ is now written as c+jd, and that of $G_{1k}G^*_{2Bm}$ as e+jf, where j is the square root of $-1$. The next step is to compute the unknown complex value $E\{S_k^n S_m^{n*}\}$ written as a+jb. Rewriting Equations (8) and (10) in terms of a to e and j:

$$x = Re\{(c+jd)(a+jb)\} = ca - db \tag{11}$$

$$\text{and } y = Re\{(e+jf)(a+jb)\} = ea - fb \tag{12}$$

Equations (11) and (12) are two simultaneous equations in two unknowns which are solved by standard methods to give the required values a and b, which in turn give $E\{S_k^n S_m^{n*}\}$.

As an example, for $G_{1k}=1$, $G_{2Am}=1$, and $G_{2Bm}=j$ for $\phi=90$ degrees, then c=1, d=0, e=0 and f=1, and a=x, b=−y.

The procedure associated with Equations (6) to (12) is repeated for each chosen pair of antenna index values k and m, and the corresponding value of $E\{S_k^n S_m^{n*}\}$ is computed in each case. These two procedures yield a set of values $E\{|S_k^n|^2\}$ for k=1 to M and $E\{S_k^n S_m^{n*}\}$ for k=1 to M−1 and m=k+1 to M which are known collectively as "covariance terms". When arranged in a square array with $E\{|S_k^n|^2\}$ terms on the array diagonal (row k and column k) and each $E\{S_k^n S_m^{n*}\}$ term at a respective row position k and column position m, this set of values is known as the "spatial covariance matrix". The entire process may be carried out independently for each DFT frequency bin, i.e. each value of transformer output index n.

Using some or all of the covariance terms in the spatial covariance matrix, the bearing (or angle of incidence or arrival) of one or more received signals may be estimated using standard techniques: see e.g. H L Van Trees "Optimum Array Processing" (part IV of "Detection, Estimation and Modulation Theory"), Wiley, New York, 2002, which discloses for example the MUSIC algorithm and least squares fitting. This is well known in the art of direction finding and will not be described.

The foregoing example invention has been described in terms of measuring antenna signal powers. The invention may however be implemented with any power-related measurement of antenna signal strength: in this connection antenna signal strength is defined as a measurement of the discrete Fourier transformer output with frequency index n in the above example, when the kth antenna is selected by switch SW1 and the input pole of SW3 is connected to ground, from which the mean squared value or power $P_{kk}$ used in Equation (1) can be derived. Examples of antenna signal strength include mean squared voltage or current, or root mean squared voltage or current, in addition to signal power itself.

Similarly, combined antenna signal strength is defined as the discrete Fourier transformer output with frequency index n, when the receiver input is the sum of the signal from the kth antenna connected through switch SW1 and the signal from the mth antenna connected through switch SW2, phase shifter P2 or P3, and switch SW3, from which the mean squared value or power $P_{km}$ used in Equations (2), (3) can be derived.

It is possible to compute the bearing of a single emitter at the frequency corresponding to index k in Equations (1) to (12), without computing the spatial covariance matrix, by an alternative procedure which will now be described. It has been found that this procedure can be faster than that which computes the spatial covariance matrix because it requires fewer measurements, but it is less accurate.

Two antennas are selected, numbered k and m, and the quantities $P_{kmA}$ and $P_{kmB}$ then are measured as described earlier. Using standard physical analysis (see e.g. H L Van Trees "Optimum Array Processing" (part IV of "Detection, Estimation and Modulation Theory"), Wiley, New York, 2002) for the case of a single plane-wave received radio signal, it may be shown that the values of $E\{|S_k^n|^2\}$ and $E\{|S_m^n|^2\}$ are equal: for convenience this value is denoted as V, i.e. $E\{|S_m^n|^2\} = E\{|S_k^n|^2\} = V$. Similarly, it may be shown that $E\{S_k^n S_m^{n*}\} = V\exp(j\theta)$, where $\theta$ is a mathematical function of the difference between the bearing of the incoming plane wave and the bearing of the line joining the antennas k and m. Equation (3) may therefore be rearranged to give:

$$P_{kmA} = V(|G_{1k}|^2 + |G_{2Am}|^2 + 2Re\{G_{1k}G^*_{2Am}\exp(j\theta)\}) \tag{13}$$

and Equation (5) may similarly be rearranged to give:

$$P_{kmB} = V(|G_{1k}|^2 + |G_{2Bm}|^2 + 2Re\{G_{1k}G^*_{2Bm}\exp(j\theta)\}) \tag{14}$$

Next, antenna k and a further antenna, numbered p, are selected. The quantity $P_{kpA}$ is then defined as equivalent to $P_{kmA}$ but for antennas k and p. $P_{kpA}$ is measured, and, by a similar analysis to that for Equations (13) and (14), may be shown to give:

$$P_{kpA} = V(|G_{1k}|^2 + |G_{2Ap}|^2 + 2Re\{G_{1k}G^*_{2Ap}\exp(j\psi)\}) \tag{15}$$

where $\psi$ is a mathematical function of the difference between the bearing of the incoming plane wave and the bearing of the line joining the antennas k and p. The three Equations (13) to (15) contain three unknown quantities, $\theta$, $\psi$, and V. $\theta$ and $\psi$ are related to each other because the angle between the line joining antennas k and m and the line joining antennas k and p is known. Given the three measurements $P_{kmA}$, $P_{kmB}$ and $P_{kpA}$, the unknown bearing of the incoming plane wave may be determined, for example by using non-linear optimisation, as previously mentioned. It is not necessary to estimate the value of V.

The principles set out above may be used in the case of more than one plane wave arriving from different bearings, to formulate equations to replace Equations (13) to (15). Additional equations are formulated in the same way for one or more further pairs of antennas (for example antenna p and antenna q), and the unknown bearings may be determined, again by using non-linear optimisation.

Signal power received by antennas 12 may fluctuate: because of this it is advantageous to carry out averaging in connection with the measured quantities $P_{kk}$, $P_{kmA}$ and $P_{kmB}$ defined above. It is convenient to define a "commutation cycle" as consisting of a cycle of collecting data as described above from each of the settings b to e, p to r, of the three switches SW1, SW2 and SW3 required to determine $P_{kk}$, $P_{kmA}$ and $P_{kmB}$ for one value of the frequency bin index n. Further data is then collected using additional commutation cycles, each cycle giving a respective set of values of $P_{kk}$, $P_{kmA}$ and $P_{kmB}$. The resulting multiple values of $P_{kk}$, $P_{kmA}$ and $P_{kmB}$ are then used to provide average values of each. These averages are then used in Equations (1) to (10) above.

The rate at which commutation cycles are carried out is referred to herein as the "commutation cycle rate". One or more of the signals received by the antennas 12 may contain periodic fluctuations, if for example data symbols are carried by a signal at a particular rate. If the period of the fluctuations is equal or close to a multiple or sub-multiple of the commutation cycle rate, then covariance terms derived as described above may be subject to consistent or systematic errors (known as "biases"). These may result in errors in estimated angles of incidence. To avoid this problem, the order in which the commutation (switch setting) is performed within each commutation cycle may advantageously be varied in a random or pseudo-random sequence between successive cycles.

Equations (1) to (15) above may be re-evaluated for other values of the frequency bin index n, e.g. adjacent frequency bands corresponding to index n−1 and n+1. Output bearing estimates are then obtained for various values of n and are combined to give an estimate for which error limits can be calculated.

A simulation was made of a direction finding system 10 of the invention having four antennas 12 in a square array and using the approach of calculating the spatial covariance matrix. The simulation envisaged two emitters with identical carrier frequencies to be located in bearing in the plane of the antenna array. The emitters were treated as both transmitting at 6.25 ksymbol/sec with a modulation type of QPSK, as described by R E Ziemer and R L Peterson, "Introduction to Digital Communication", Maxwell Macmillan International, New York, 1992. They were at respective bearings or angles of arrival of 30° and 70° at the antenna array relative to a predefined reference direction. The signal to noise ratio (emitted signal power divided by total noise power over 25.6 MHz bandwidth) was assumed to be high. The sampling rate was 25.6 MHz and a block of 4096 samples were collected, a Hamming window was applied (see Oppenheim et al. mentioned above), and the result was processed by discrete Fourier transform. The sample collection time was 0.16 milliseconds, which corresponds to one emitter symbol period. If only one block of samples were to be processed, results are poor, because signals are highly correlated over the sample collection time. First and second blocks of samples were collected with an intervening time interval corresponding to at least three symbols to avoid this. Emitters of interest often contain a root raised cosine (RRC) pulse shaping filter which is shorter than this intervening time interval, in which case there is no correlation between signals in the sample blocks. The overall covariance matrix was then derived using parameters obtained using Equations (1) to (10) for both data blocks and averaging. Matrix elements were processed using the known MUSIC algorithm (see Van Trees mentioned above) to determine emitter bearings. This algorithm is neither the only nor even the best algorithm for this purpose, but it is simple and often suggested for that reason.

Figure 2:
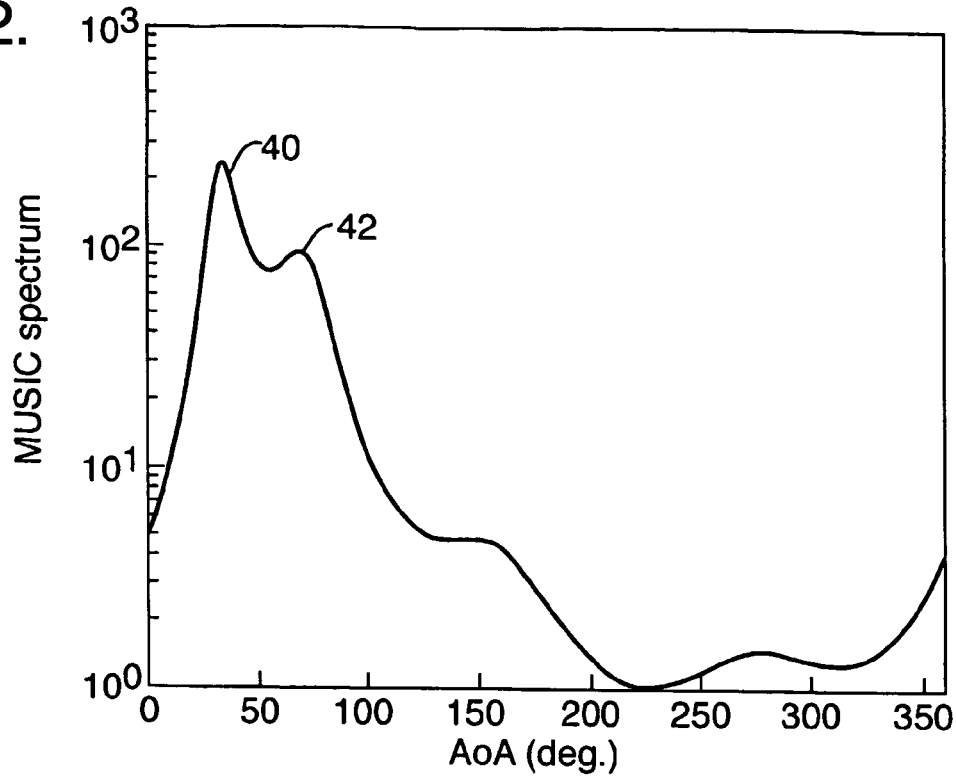
FIG. 2 is a graph illustrating direction finding results obtained using the invention.

FIG. 2 is a graph of MUSIC spectrum against angle of arrival (AoA) derived from covariance matrix elements obtained using the method of the invention. It shows reasonably well-defined peaks 40 and 42 at angles of arrival of 30° and 70°, showing that the simulated emitters have been located.

Figure 3:
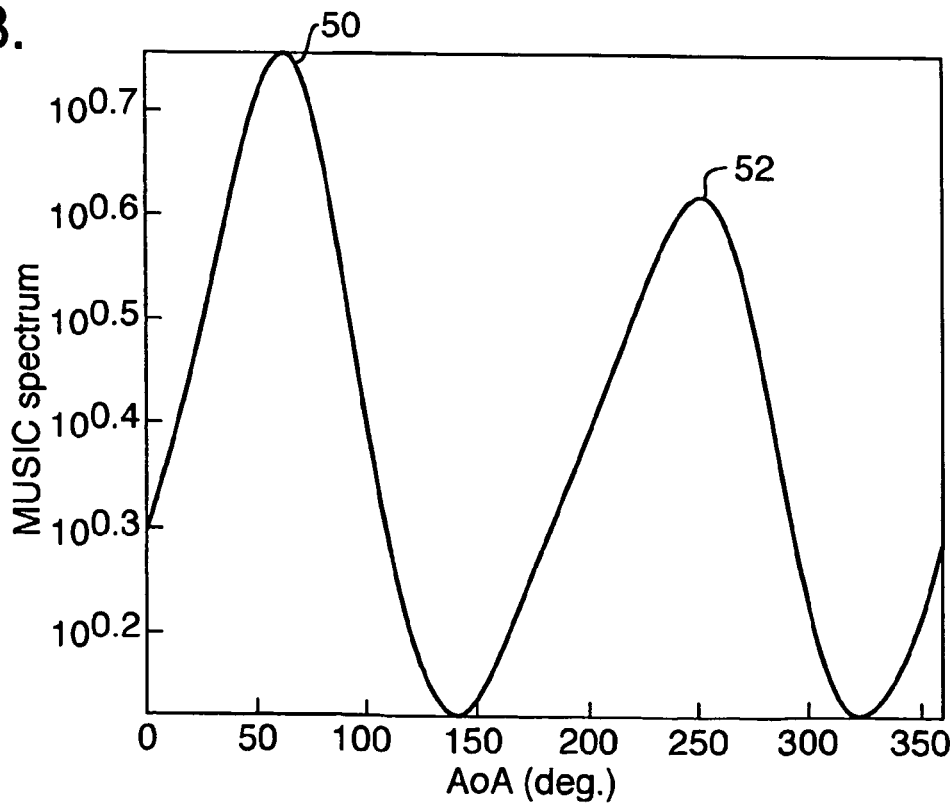
FIG. 3 is a graph illustrating direction finding results obtained using a single receiver prior art system comparable with the invention.

For comparison, a trial was made of the single receiver technique disclosed by C M S See, "High Resolution DF with a Single Channel Receiver", 0-7803-7011-2/01 IEEE 2001. Using the same parameters and MUSIC algorithm processing, this technique gave the results shown in FIG. 3. Here the emitter at 30 degrees has not been resolved, and the 70 degree emitter has been resolved at 50, but with a peak height ~15× smaller than the peak 42 (NB FIGS. 2 and 3 have axes with different scales).

For completeness the conventional method (which requires one receiver per antenna) was also simulated using the same parameters and MUSIC algorithm processing. This method gave the results shown in FIG. 4. It shows very well defined peaks 60 and 62 at angles of arrival of 30° and 70°, showing that the simulated emitters have been located with better accuracy than the invention, but this is at the expense of using one receiver per antenna instead of one receiver only for all antennas.

The invention claimed is:

1. A direction finding system comprising:
   a) a plurality of antennas;
   b) means for determining individual signal strengths of signals received by each of the plurality of antennas;
   c) combining means for deriving combined antenna signal strengths by forming combinations of first and second antenna signals derived from different antennas, wherein the second antenna signals are in two sets with signals in one set having a non-zero phase difference relative to signals in the other set; and
   d) means for determining at least one emitter bearing from the individual and combined antenna signal strengths measured.

2. A direction finding system according to claim 1 wherein the means for determining emitter bearing is arranged to derive covariance matrix elements from antenna signal strengths and to determine emitter bearing therefrom.

3. A direction finding system according to claim 1 wherein the means for determining emitter bearing is arranged to derive a relationship between antenna signal strengths and emitter bearing and to determine emitter bearing therefrom.

4. A direction finding system according to claim 1 wherein the relative phase difference is in the range 30 to 120 degrees, and the means for determining individual antenna signal strengths and the combining means are arranged to enable successive signal strengths to be derived in successive steps.

5. A direction finding system according to claim 1 wherein the relative phase difference is substantially 90 degrees.

6. A direction finding system according to claim 5 wherein the combining means is arranged to combine antenna signals with equal gain magnitude and with equal and unequal phase.

7. A direction finding system according to claim 1 wherein the combining means incorporates phase shifting means switchable into and out of an antenna signal path.

8. A direction finding system according to claim 1 wherein the combining means incorporates an adder having two inputs both switchably connected to individual signal paths extending to respective antennas.

9. A direction finding system comprising:
a) a plurality of antennas;
b) means for determining individual antenna signal strengths, the means for determining individual antenna signal strengths comprising a first multipole switch having input poles connected to receive signals from respective antennas;
c) combining means for deriving combined antenna signal strengths by forming combinations of a first and second antenna signals derived from different antennas, wherein the second antenna signals are in two sets with signals in one set having a non-zero phase difference relative to signals in the other set, the combining means incorporating a second multipole switch having input poles connected to receive signals from respective antennas and a third multipole switch for switching phase shifting means into and out of an antenna signal path extending via the second multipole switch;
d) the combining means also incorporating adding means for combining signals, the adding means being arranged to add an antenna signal in a first signal path extending via the first multipole switch to another antenna signal in a second signal path extending via the second and third multipole switches; and
e) means for determining at least one emitter bearing from antenna signal strengths.

10. A method of direction finding using a plurality of antennas comprising the steps of determining:
a) individual signal strengths of signals received by each of the plurality of antennas;
b) combined antenna signal strengths by forming combinations of first and second antenna signals derived from different antennas, wherein the second antenna signals are in two sets with signals in one set having a non-zero phase difference relative to signals in the other set; and
c) at least one emitter bearing from the individual and combined antenna signal strengths measured.

11. A method according to claim 10 wherein the step of determining emitter bearing is implemented by deriving covariance matrix elements from antenna signal strengths and determining emitter bearing therefrom.

12. A method according to claim 10 wherein the step of determining emitter bearing is implemented by deriving a relationship between antenna signal strengths and emitter bearing and determining emitter bearing therefrom.

13. A method according to claim 10 wherein the relative phase difference is in the range 30 to 120 degrees and successive signal strengths are determined in successive steps.

14. A method according to claim 13 wherein the relative phase difference is substantially 90 degrees.

15. A method according to claim 10 wherein the step of forming combined antenna signal strengths combines antenna signals with equal gain magnitude and with equal and unequal phase.

16. A method according to claim 12 wherein the step of forming combined antenna signal strengths includes switching a phase shift into and out of an antenna signal path.

17. A method according to claim 12 wherein the step of forming combined antenna signal strengths includes adding signals in signal paths extending switchably to different antennas.

18. A method of direction finding using a plurality of antennas comprising the steps of determining:
a) individual antenna signal strengths;
b) combined antenna signal strengths by forming combinations of first and second antenna signals derived from different antennas, wherein the second antenna signals are in two sets with signals in one set having a non-zero phase difference relativerel-a-tiftg to signals in the other set; and
c) at least one emitter bearing from the antenna signal strengths, wherein step a) comprises switching signals from antennas via a first path; and step b) incorporates:
 i) switching signals from antennas via a first path for combining;
 ii) switching signals from antennas via a switch selectable second path or a third path for combining, the third path being arranged to phase shift antenna signals therein relative to antenna signals in the second path; and
 iii) adding a first path antenna signal to second and third path antenna signals individually.

19. A method of direction finding using a plurality of antennas comprising the steps of determining:
a) individual antenna signal strengths by switching signals from the antennas via a first path;
b) combined antenna signal strengths by forming combinations of first and second antenna signals derived from different antennas, wherein the second antenna signals are in two sets with signals in one set having a non-zero phase difference relative to signals in the other set; and
c) covariance matrix elements using the individual and combined antenna signal strengths measured, and determining at least one emitter bearing therefrom; wherein the step of determining combined antenna signal strengths incorporates:
 i) switching signals from antennas via a first path for combining;
 ii) switching signals from antennas via a switch selectable second path or a third path for combining, the third path being arranged to phase shift antenna signals therein relative to antenna signals in the second path; and
 iii) adding a first path antenna signal to second and third path antenna signals individually.

20. A direction finding system incorporating:
a) a plurality of antennas;
b) measuring apparatus for determining strengths of signals received by each of the plurality of antennas;
c) a combining circuit for deriving combined antenna signal strengths by forming combinations of first and second antenna signals derived from different antennas, wherein the second antenna signals are in two sets with signals in one set having a non-zero phase difference relative to signals in the other set; and
d) digital signal processing apparatus for determining at least one emitter bearing from the individual and combined antenna signal strengths measured.

* * * * *

UNITED STATES PATENT AND TRADEMARK OFFICE
CERTIFICATE OF CORRECTION

PATENT NO. : 7,612,715 B2  Page 1 of 1
APPLICATION NO. : 10/563495
DATED : November 3, 2009
INVENTOR(S) : Malcolm Davd Macleod It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 310 days.

Signed and Sealed this

Nineteenth Day of October, 2010

David J. Kappos
*Director of the United States Patent and Trademark Office*